Sept. 29, 1959
V. P. HARRIS
2,906,510
HAND MIXER FOR FOOD
Filed June 3, 1958
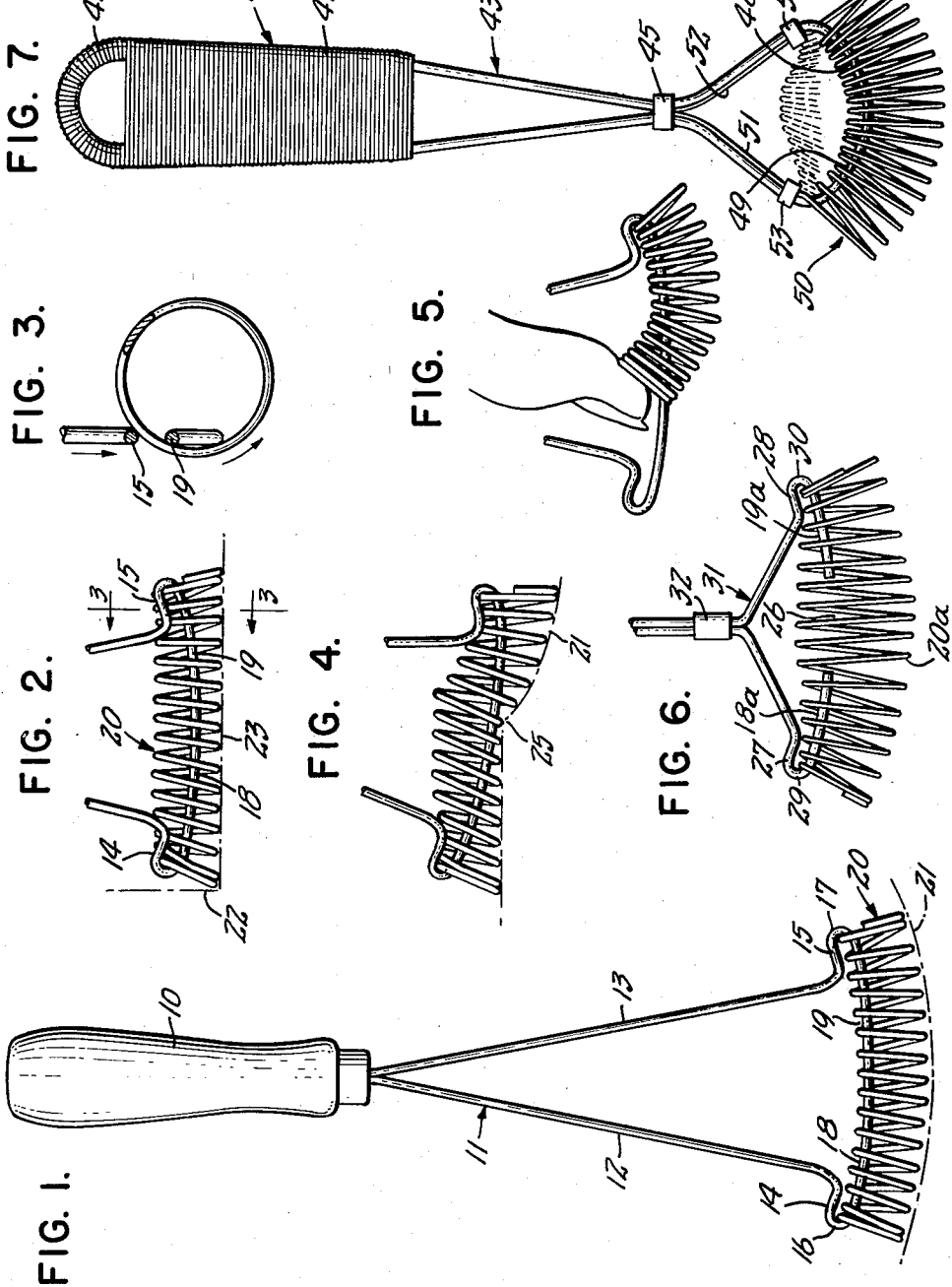
INVENTOR
VICTORIA P. HARRIS
BY
Robert Irving Williams
ATTORNEY

United States Patent Office 2,906,510
Patented Sept. 29, 1959

2,906,510

HAND MIXER FOR FOOD

Victoria P. Harris, New York, N.Y.

Application June 3, 1958, Serial No. 739,493

5 Claims. (Cl. 259—144)

This application is a continuation-in-part of my copending application Serial No. 544,398, filed November 2, 1955, now abandoned.

This invention relates to manually-operated mixing devices, and more particularly to devices for blending gravy, sauce, and the like, folding flour into beaten egg whites, aerating fruit juices, and performing similar operations.

Such operations are performed in a variety of types of containers including roasting pans, frying pans, sauce pans, double boilers, and bowls, all of which have widely different contours but in all of which it is important that the mixing element reach all surfaces and edge corners in which the substance being mixed may lodge. Again, it is important that tendencies to clog with thick, heavy, or lumpy ingredients be minimized. For example, when ingredients of gravy or other materials to be mixed under heat are not reached by the mixing element, the unmixed parts tend to scorch, and, whether or not heat is used, tend either to be wasted and to cause unnecessary difficulty in washing the pan, or to come loose during the terminal period of the mixing and to provide undesirable lumps in the product.

It is also important that the handle of the device extend vertically from the operative head thereof to permit ready mixing in a deep pan, such as the top of a double boiler, while avoiding scorching or sticking, and to maintain the hand well away from the heat as when juices, flour, and water are heated in a roasting pan to make gravy.

With the foregoing and other considerations in view, the present invention contemplates the provision of a simple and sturdy mixing device which is easy and inexpensive to manufacture and assemble, which will readily conform to a wide variety of shapes of surfaces and corners, and which will effectively serve, under a wide variety of conditions, the purposes for which it is intended.

In various of its aspects, moreover, the invention contemplates the provision of particularly effective means for holding a mixing element in place so that, while being firmly held, it will adjust with particular readiness to various contours; the provision of a mixing device which can be cleaned with particular ease; the provision in a mixing device of mixing-element-holding means adapted for the removal and replacement of the mixing element; and the provision of mixing elements of particularly effective contour.

The invention accordingly comprises an article of manufacture possessing the features, properties, and the relation of elements which will be exemplified in the articles hereinafter described and the scope of the application of which will be indicated in the claims.

For a fuller understanding of the nature and objects of the invention, reference should be had to the following detailed description taken in connection with the accompanying drawings, in which:

Figure 1 is a front view of a preferred form of device embodying the invention, showing the position of the parts in normal position wherein they are adapted for one type of use;

Fig. 2 is a similar view showing the position of the parts in another type of use;

Fig. 3 is an enlarged sectional view on the line 3—3 of Fig. 2;

Fig. 4 is a fragmentary front view showing the position of the parts in still another type of use;

Fig. 5 is a similar view showing a positioning of the parts for cleaning purposes;

Fig. 6 is a fragmentary front view showing a device embodying certain modified types of construction; and Fig. 7 is a view similar to Fig. 1 showing a device embodying other modified types of construction.

The form of device exemplified in Figs. 1–5 comprises a handle portion 10, which may, for example, be of wood, a frame 11 which, as exemplified, is composed of stiff wire providing portions 12 and 13 which extend forwardly from the handle in outwardly diverging, inverted V-shaped (wedge-shaped) conformation, then generally outwardly at 14 and 15, then forwardly at 16 and 17, and finally inwardly to provide holding portions 18 and 19, which in the present instance, are integral so that the entire frame is provided by a single strand of wire. Mounted on the holding portions, and retained in place by the forward and outward portions of the frame, is a helix-like coil spring 20 formed of spring wire of smaller cross-sectional area than the frame wire. The coil thus extends transversely of the device at one end thereof with the terminal turns having substantial components facing outwardly and with the intermediate turns so held that they may yield to permit the coil to adjust to various irregular contours of pan surfaces. The coil spring terminates in terminal coils having components facing away from each other in opposite directions. The coil spring has a natural expansion greater than the distance between the forwardly-extending parts 16 and 17, so that the rear part of the coil spring will be held under compression, permitting the coil to bow forwardly and conform to the downwardly-curved surface 21 of the juice-collecting cavity of a roasting pan as shown in Fig. 1, or of the bottom of a bowl, and so that the forward parts of the terminal turns will extend outwardly beyond the frame so as to reach into a right-angle (for example) edge corner 22 of a roasting pan, a double-boiler top, or other pan as shown in Fig. 2. The distance between the portions 14 and 18 and between 15 and 19 is sufficiently greater than the thickness of the strand of the coil spring to permit the forwardly-bowed coil spring to swing laterally to the position of Figs. 2 and 3 so that its turns will readily conform to a flat surface 23 of a pan, but sufficiently small so that, when downward pressure is applied, the swinging movement will be limited by the portions 14 and 18 and the portions 15 and 19, as shown in Fig. 2, so that the frame will still be well spaced from the bottom of the pan, and the end turns of the coil spring will still extend outwardly beyond the frame portions in a downward direction in which they will reach into an edge corner of the pan as they are moved thereinto in one endwise direction or the other.

Figs. 1, 2, 3, and 4 show varying relationships of the coil and frame to cause the mixing device to adapt itself to concave, to convex, to straight-line or to other shapes at its operative surface as demanded by vessel contours while the handle is held and used in any position from horizontal to vertical, as required by the depth of the vessel in which it is used or the convenience of the user. Fig. 1 shows the coil 20 in its normal position for fitting into a concave surface, whether the handle is held vertically or horizontally. Fig. 4 shows the coil assuming a position for fitting against a convex surface when pressure is applied thereto. This too may occur with the handle held vertically or horizontally. The forward arc of the coil may be distorted as shown or from its side. Figs. 2 and 3 show how the frame moves downward and grips against the inner and outer sides of the turns of the coil, flattening the segment along its length. This is achieved with the handle in any position from horizontal to vertical so long as light pressure is applied to the handle causing the shift in the relationship of the frame and the coil. A flat contour of the coil may be swiped against the bottom of a flat vessel by swinging it forwardly and rearwardly without the complete elimination of its sidewise bowed conformation. The bowed sidewise portion of the coil will thus scrape against the curved side walls of a pan at the same time the flattened area scrapes against the bottom of a pan.

The resiliency of the coil spring and the spacing of its coils from the holding portions 18 and 19 enables it to readily adapt itself to convex portions of a pan, as the edge portions 25 of the concave surface 21, as shown in Fig. 4.

Because of the free mounting of the coil spring between the parts 14 and 18 and between the parts 15 and 19, the coil spring can be readily drawn back from either end, as shown in Fig. 5, to facilitate cleaning.

The terminal turns of the coil spring are so wound as to touch each other for the last one third of the circumference of the coil to assure against the coil working itself off the holding portions.

The coil of the coil spring is preferably about three to four inches in length and three fourths of an inch to one and one half inches in exterior diameter with twelve to twenty turns of eighteen gage spring steel wire. The wire of the frame is preferably ten gage. The rear end portions of the wire of the frame 11 extend into the handle portion 10 and are joined thereto by heat-resisting and moisture-resisting adhesives or by clamping, riveting or other suitable mechanical means. The overall length of the mixer, as exemplified, is about eleven inches.

In Fig. 6, there is illustrated a device which is similar to that of Figs. 1–5 except that it embodies certain modifications. In this instance, the holding portions, here illustrated at 18a and 19a, instead of forming a continuous extent of wire, are terminated at points outward of the median plane of the coil so as to leave a space 26 therebetween thru which the coil can be slipped out (after being compressed toward one end or the other), for replacement when worn or replacement by a coil spring of different shape. There is also illustrated as in place in the device, a coil spring 20a having increasingly large coils toward its median plane, so as to facilitate conformation to various surfaces. The retaining portions 27 and 28 and 29 and 30 of the frame 31 are formed similarly to the portions 14 and 15 and 16 and 17, respectively, and serve the same function. The inverted V-shaped portion of the frame 31 is foreshortened slightly as compared with the frame 11, and the sides are clamped together by a clamping member 32, thus providing extra strength in the frame and compensating for the break between the holding portions. The rear portions of the frame extend directly back to a handle like that of Fig. 1. Except as indicated above, the construction exemplified in Fig. 6 is similar to that of Fig. 1.

In the form of construction shown in Fig. 7, there is provided a handle portion 40, which, as exemplified, is provided by windings of light wire 41 and 42 on the ends of an internal stiff wire frame piece 43. The side portions of the wire 43 are brought together and clamped by a clamping member 45 and then spread outwardly in inverted-V-shaped (wedge-shaped) formation to provide a retaining portion, and then curved around at its lower end to provide holding portions 48 and 49 which, like those of Figs. 1–5, are continuous to provide an unbroken holding element.

The coil spring 50 is similar to that of Figs. 1–5 except that the end portions 51 and 52 of the coil, instead of being formed to touch the adjacent turns, are bent back and clamped against the frame piece 43 by clamping members 53 and 54 near the wide end of the V-shaped portion thereof and continue under clamping member 45 to be there clamped. These portions 51 and 52 may be welded under the clamping members or otherwise secured by swedging or under them by heat-resistant means. As shown, the coil spring 50 is held to a greater extent than the coil spring 20, but the terminal turns still have a substantial outward-facing component.

These end coils facing outwardly from the vertical plane of the handle, in combination with the flexible coiled head 50 which is compressible to flatten out into a straight line or to assume a convex shape as shown by dotted lines, as with head 20, cooperate to produce a head which will likewise mix in right angle corners of pans. Lumpy, thick material too heavy to be dislodged between the coils may be emptied out through the outwardly-facing open end coils.

Since certain changes may be made in the above article and different embodiments of the invention could be made without departing from the scope thereof, it is intended that all matter contained in the above description or shown in the accompanying drawings shall be interpreted as illustrative and not in a limiting sense.

I claim:

1. A mixing device comprising a generally longitudinally-extending handle portion, a retaining portion carried thereby, means associated with said retaining portion and providing generally transversely-extending holding portions at each of two opposite sides of the center line of said handle portion, a coil spring extending substantially transversely about said holding portions and terminating in terminal coils having components facing away from each other in opposite directions, portions of said terminal coils distant from said handle extending transversely to a greater extent than any part of said holding portions or said retaining portion, the coil having an inner diameter greater than the greatest cross-sectional extents of said holding portions and the strand thereof being of less cross-sectional area than the holding portions, and means on said retaining portion near the outer ends of said holding portions for retaining said coil spring at the side thereof toward said handle portion under compression on said holding portions with the coil spring bowed slightly away from said handle portion and with terminal turns thereof extending transversely outwardly beyond said retaining portion and beyond said holding portions at the side of the coil away from the handle portion but having substantial components facing away from each other in opposite directions, whereby said coil spring will conform to a flat portion of a pan, to a concave portion of a pan, and to a convex portion of a pan, and will fit into opposite corner edges of a pan when moved into one or the other thereof in either of two opposite directions.

2. A mixing device as set forth in claim 1 wherein said retaining portion comprises members extending from said respective holding portions toward said handle portion and then inwardly a short distance parallel with the respective holding portions at a distance therefrom greater than the thickness of the strand of the coil to permit the coil to swing forwardly and rearwardly so as to lie flat against a flat surface without the complete elimination of its bowed conformation.

3. A mixing device as set forth in claim 2 wherein the coil is freely and removably held on said holding portions and wherein said holding portions are centrally separated to permit the removal and replacement of said coil.

4. A mixing device as set forth in claim 1 wherein the central turns of the coil have a greater diameter than the outer turns thereof.

5. A mixing device as set forth in claim 1 wherein there extend from said terminal coils continuations of said coil spring, and means securing said continuations to said retaining portion.

References Cited in the file of this patent

UNITED STATES PATENTS

| | | |
|---|---|---|
| 504,112 | Paine | Aug. 29, 1893 |
| 771,088 | Paley et al. | Sept. 27, 1904 |
| 2,442,326 | Pribil | May 25, 1948 |
| 2,707,366 | Gartner | May 3, 1955 |

FOREIGN PATENTS

| | | |
|---|---|---|
| 608,387 | Great Britain | Sept. 14, 1948 |
| 618,185 | Great Britain | Feb. 17, 1949 |